United States Patent [19]

Fukuda

[11] 4,442,528
[45] Apr. 10, 1984

[54] PULSE COMMUNICATION METHOD AND SYSTEM USING CMI TO 3-LEVEL CMI CONVERSION

[75] Inventor: Akira Fukuda, Yokohama, Japan

[73] Assignee: Sumitomo Electric Industries, Ltd., Osaka, Japan

[21] Appl. No.: 368,846

[22] Filed: Apr. 14, 1982

[30] Foreign Application Priority Data

Apr. 27, 1981 [JP] Japan ............... 56-64898
Mar. 5, 1982 [JP] Japan ............... 57-34983

[51] Int. Cl.³ .......................................... H03K 13/24
[52] U.S. Cl. ..................... 375/20; 340/347 DD; 455/608
[58] Field of Search .............. 375/17, 19, 20; 360/40; 340/347 DD; 455/608, 611

[56] References Cited

U.S. PATENT DOCUMENTS 3,953,673  4/1976  Dorward ..................... 375/19
4,071,692  1/1978  Weir et al. ................. 375/20
4,189,621  2/1980  Scott ........................ 360/40

OTHER PUBLICATIONS

Takasaki et al., "Line Coding Plans for Fiber Optic Comm 51st", Conference Record vol. II ICC, June 1975, pp. 32-20-32-34.
Japanese Patent Application No. 99944/1974.

Primary Examiner—Robert L. Griffin
Assistant Examiner—Stephen Chin
Attorney, Agent, or Firm—Cushman, Darby & Cushman

[57] ABSTRACT

This invention provides a pulse communication method and system capable of converting a data pulse signal into a CMI code and then converting it further into a 3-level CMI signal having a positive and a negative pulse including a data signal and a clock signal for transmission so that the data signal and the clock signal are separately extracted on the reception side. The pulse communication method and system according to this invention is characterized in that the system has large speed and capacity of signal transmission, the apparatus can be constructed compact, and the condition of the transmission line can be monitored easily utilizing the fact that the average value of the 3-level CMI signals is a half of the peak value of the 3-level CMI signals. This invention is highly effective applied in the field of light pulse communication using optical fiber.

11 Claims, 9 Drawing Figures

| Fig. 3A | Fig. 3B |

PULSE COMMUNICATION METHOD AND SYSTEM USING CMI TO 3-LEVEL CMI CONVERSION

BACKGROUND OF THE INVENTION

The present invention relates to method and system for pulse communication which has a large signal transmission speed and a large transmission capacity and yet is capable of monitoring the signal transmission line, and, more particularly, to method and system for pulse communication suitable for optical pulse communication by optical fibers.

Figure 1:
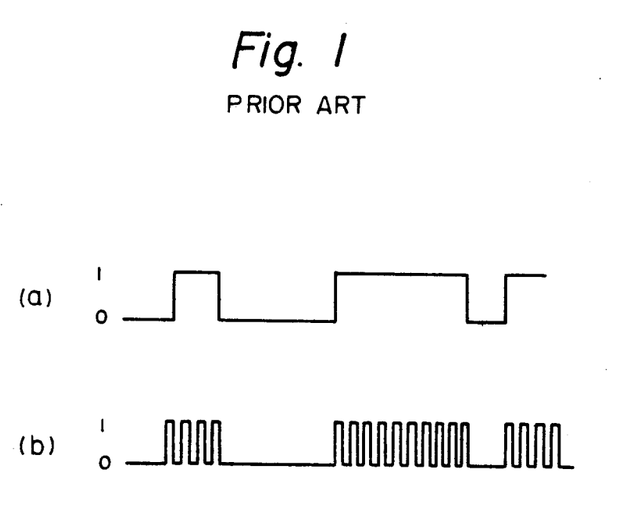
FIG. 1 is a view illustrative of the principle of the conventional pulse communication systems.

FIG. 1 illustrates the principle of a heretofore used pulse communication systems. The heretofore known pulse communication systems included a 2-level pulse communication system in which data signals were transmitted by logical 0 and 1 as shown in FIG. 1(a) and an envelope modulation pulse communication system in which repetition pulses were subjected to envelope modulation as shown in FIG. 1(b). The 2-level pulse communication had a disadvantage that it was unable to determine whether absence of a data signal denoted one of the 2-level pulse signal or some trouble in the signal transmission line. Further, in the case where a transmission line monitor signal had to be inserted in the pulse signal of high speed, the 2-level pulse communication system had a further disadvantage that the apparatus had to be large in construction to detect the phase of the signal accurately. On the other hand, the envelope modulation pulse communication system had a disadvantage that the signal transmission speed was lower than the pulse repetition frequency.

Accordingly, an object of the present invention is to provide method and system for pulse communication which is simple in circuit construction and yet large in signal transmission capacity and capable of transmitting clock signals and transmission line monitor signals with the transmission data signals by converting the transmission data signal into a CMI (Coded Mark Inversion) code and further converting it into a 3-level CMI code for transmission.

SUMMARY OF THE INVENTION

The foregoing object and others are accomplished in accordance with the present invention by converting a data pulse signal into a CMI code and then converting it further into a 3-level CMI signal having a positive and a negative pulse including a data signal and a clock signal for transmission so that the data signal and the clock signal are separately extracted on the reception side. The pulse communication system according to the present invention is characterized in that a transmission clock multiplying circuit for multiplying a transmission clock signal to a required frequency, a CMI coded sequential circuit for converting a data signal to be transmitted into a CMI code, a 3-level CMI signal coding circuit for converting the CMI code into the 3-level CMI signal a signal transmission line for transmitting the 3-level CMI signal from the transmission side to the reception side, a 3-level CMI signal decoding circuit for decoding the received 3-level CMI signal into the CMI code, a CMI decoding sequential circuit for decoding the decoded CMI code into the data signal, and a clock circuit for extracting the multiplied clock from the received 3-level CMI signal and regenerating the received clock signal.

The present invention will be more fully understood from the detailed description given hereinbelow and the accompanying illustrations which are intended to describe but not limit the scope of the present invention.

DETAILED EXPLANATION OF THE INVENTION

Figure 2:
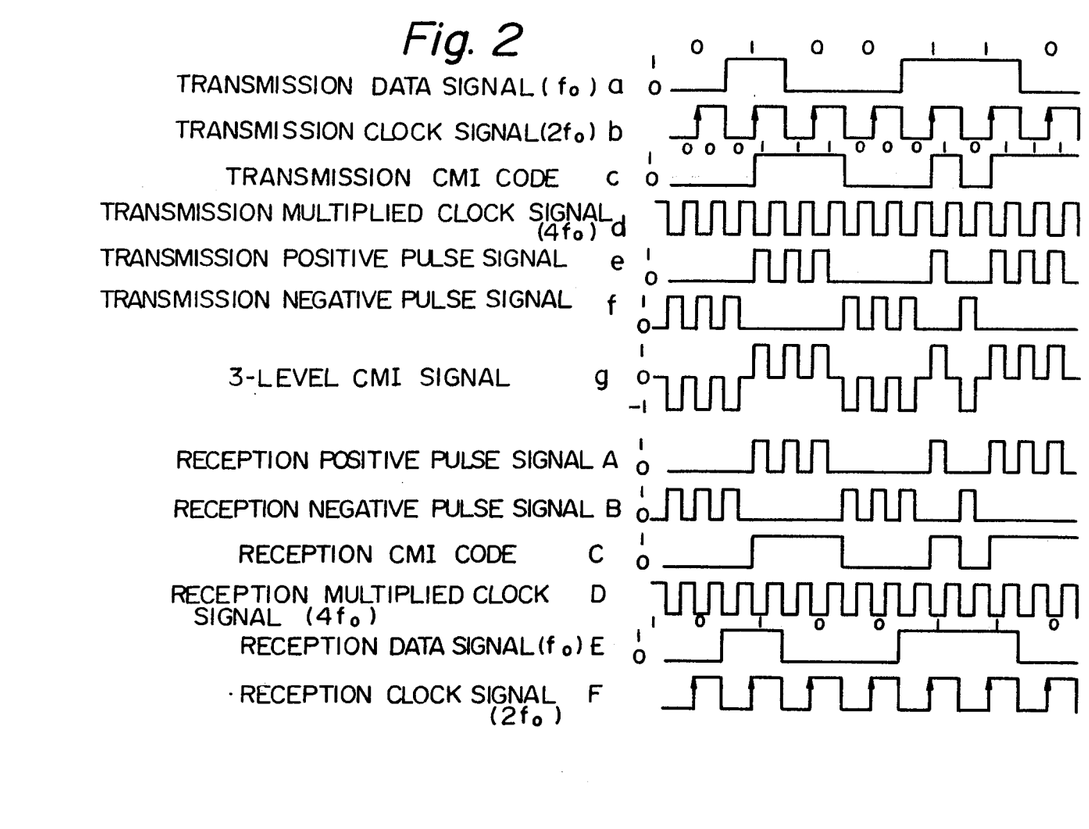
FIG. 2 is a view showing the principle of the pulse communication method according to the present invention.

FIG. 2 shows the principle of the pulse communication method according to the present invention, in which a transmission data signal ⓐ is converted into a CMI code ⓒ and thereafter modulated into a 3-level CMI signal ⓖ and transmitted by the signal transmission line. On the reception side, the received signal is demodulated separately into the data signal and the clock signal. In the example of FIG. 2, 01 of the CMI code ⓒ is corresponded to logical 1 of the transmission data signal ⓐ and 11 or 00 of the CMI code ⓒ is corresponded to logical 0 of the transmission data signal ⓐ while 10 of the CMI code ⓒ is not corresponded to any of logical 1 and 0 of the transmission data signal ⓐ. Further, 00 and 11 of the CMI code ⓒ are alternatively corresponded to logical 0 of the transmission data signal ⓐ.

The transmission data signal ⓐ of frequency fo is sampled at the middle of the signal frequency in synchronism with the rising of the transmission clock signal ⓑ of frequency 2fo and is converted into the transmission CMI code ⓒ in accordance with the correspondence described above. In the example of FIG. 2, since 00 of the transmission CMI code ⓒ is corresponded to the first transmission data signal 0, 11 and 00 are alternatively repeatedly corresponded to logical 0 of the further transmission data signal ⓐ. Then, the transmission CMI code ⓒ is converted in synchronism with the rising of a transmission multiplied clock signal ⓓ of frequency 4fo into the 3-level CMI signal ⓖ to logical 0 and −1 of which logical 1 and 0 of the transmission CMI code are corresponded. Accordingly, logical 1 of the transmission data signal ⓐ is converted into one negative pulse and one positive pulse of the 3-level CMI signal ⓖ in correspondence with the falling and the rising, respectively, of the transmission clock signal. Likewise, logical 0 of the transmission data signal ⓐ is converted into two positive pulses or two negative pulses of the 3-level CMI signal (g) in correspondence with the falling and the rising, respectively, of the transmission clock signal. Since it is so prearranged that logical 0 of the transmission signal is corresponded to 00 and 11 alternatively in conversion into the transmission CMI code (c), the two positive or negative pulses of the 3-level CMI signal (g) are pulse signals having the signs opposite to two pulse signals used for logical 0 of the transmission data signal (a) immediately before them. This 3-level CMI signal is transmitted to the reception side through the signal transmission line.

Since logical 1 of the transmission data signal (a) is corresponded to one negative pulse and one positive pulse of the 3-level CMI signal (g) and since logical 0 of the transmission data signal (a) is corresponded to two positive pulses and two negative pulses alternatively, the probability of occurrence of logical 0 and 1 in the 3-level CMI signal (g) as a whole is 1:1. For this reason, the average value of the 3-level CMI signal (g) is half of the peak value (in FIG. 2, it is the half of the maximum value $+1$ and the minimum value $-1$, that is 0), to make the level of the transmission signal easily detectable. This characteristic can be utilized as an abnormality monitoring signal of the signal transmission line. That is, since the half value level varies when an abnormality occurs in the signal transmission line, the abnormality can be detected by comparing the half value level with the predetermined reference value by means of a comparator. This characteristic of the system according to the present invention is effective particularly in the optical pulse communication system in which the signal is transmitted by the optical pulse in the optical fiber. Further, since both the positive pulse and the negative pulse of the 3-level CMI signal (G) are corresponded to the rising or the falling of the transmission clock signal (b) and since 10 of the transmission CMI code (c) is not corresponded to any of logical 0 and 1 of the transmission data signal (a), it can be distinguished whether the pulse of the 3-level CMI signal corresponds to the rising or to the falling of the clock signal. For this reason, the pulse communication system according to the present invention can transmit the clock signal with the data signal. Naturally, the transmission data signal (a) can be demodulated to a reception data signal through reverse steps to the transmission, by corresponding logical 1 of the reception data signal to 01 of the reception CMI code (c) and corresponding logical 0 of the reception data signal to 00 or 11 of the reception CMI code (c). As described above, the 3-level CMI signal to be transmitted includes the data signal, the clock signal, and the transmission line monitoring signal.

In the present invention, since the transmission data signal (a) is transmitted in the multiplied clock frequency 4fo which is four times the frequency fo of the transmission data signal, the necessary transmisson band is only four times the signal pulse frequency. That is, one fourth of the transmission band can be used as the data signal. Further, the reception timing clock signal corresponding to the reception data signal can be easily extracted by a sequence circuit operated with the clock signal four times the transmission speed without using any complicated circuit such as PLL circuit. The reception data signal includes clock information including phase, and the clock information can be easily regenerated by the sequential circuit transiting in the clock frequency twice the transmission speed. Since 10 of the CMI code is not used as data, another advantage is provided that even if the phase of the clock is shifted 180 degrees with respect to the data signal, it can be corrected.

In the foregoing explanation, although it has been prearranged that 01 of the CMI code is corresponded to logical 1 of the data signal, and 11 and 00 of the CMI code are alternatively corresponded to logical 0 of the data signal while 10 of the CMI code is not corresponded to any of logical 1 and 0 of the data signal, the correspondence may be prearranged otherwise. That is, in a case, (a) 01 of the CMI code is corresponded to logical 0 of the data signal, 11 or 00 of the CMI code are alternatively corresponded to logical 1 of the data signal, and when 10 of the CMI code is not corresponded to any of logical 1 and 0 of the data signal; (b) 10 of the CMI code is corresponded to logical 1 of the data signal, 11 and 00 of the CMI code are alternatively corresponded to logical 0 of the data signal, and when 01 of the CMI code is not corresponded to any of logical 1 and 0 of the data signal; (c) 10 of the CMI code is corresponded to logical 0 of the data signal, 11 and 00 of the CMI code are alternatively corresponded to logical 1 of the data signal, and 01 of the CMI code is not corresponded to any of logical 1 and 0 of the data signal. Further, in the case of correspondence of the CMI code to the 3-level CMI signal, while it has been described in the foregoing explanation that the positive pulse is corresponded to logical 1 and the negative pulse is corresponded to logical 0, they may be otherwise corresponded, for example, the negative pulse is corresponded to logical 1 and the positive pulse is corresponded to logical 0.

Figures 3, 3A:
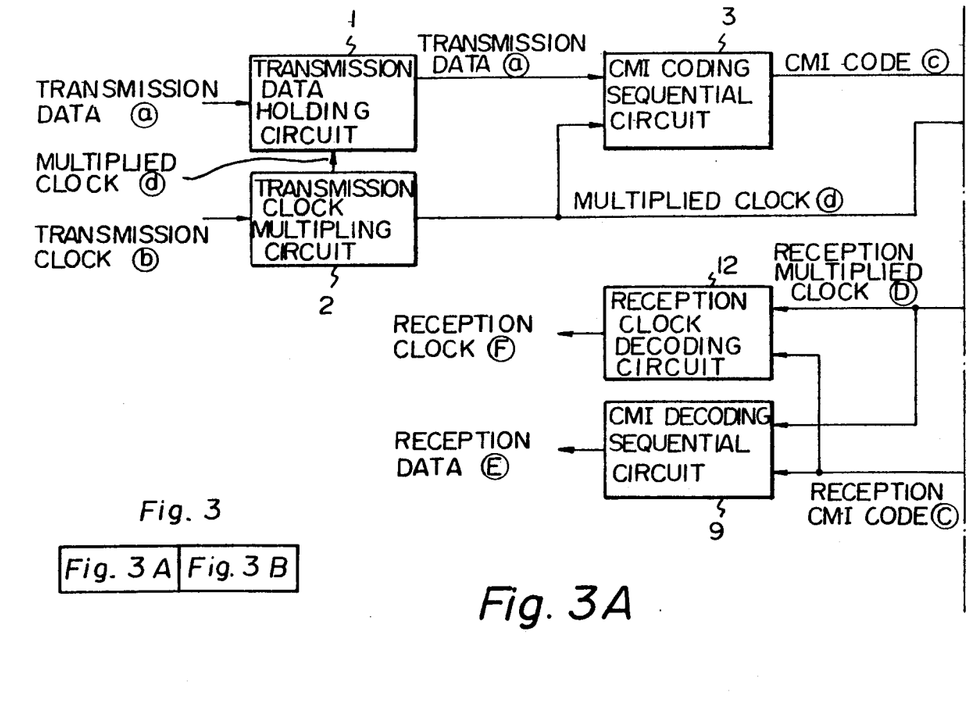
FIGS. 3A and 3B are a block diagram showing a pulse communication system for practising the pulse communication system according to the present invention.
Figure 3B:
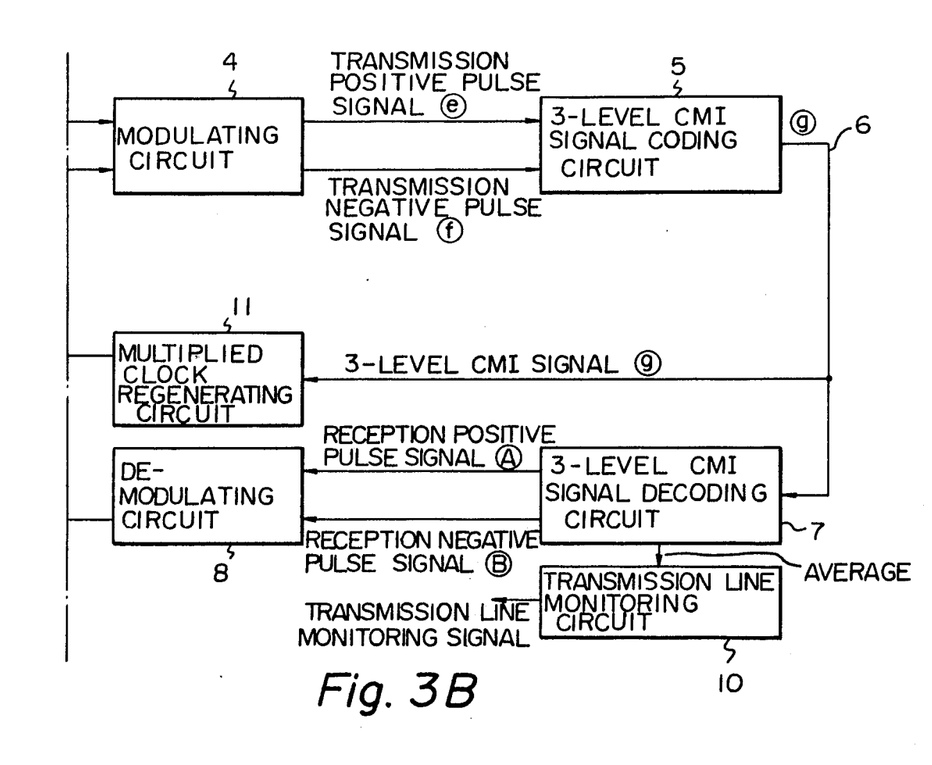

FIGS. 3A and 3B are a block diagram showing a pulse communication system for practising the pulse communication system according to the present invention, comprising a transmission data holding circuit 1, a transmission clock multiplying circuit 2, a CMI coding sequential circuit 3, a modulating circuit 4, a 3-level CMI signal coding circuit 5, a signal transmission line 6, a 3-level CMI signal decoding circuit 7, a demodulating circuit 8, a CMI decoding sequential circuit 9, a transmission line monitoring circuit 10, a multiplied clock regenerating circuit 11, and a reception clock decoding sequential circuit 12. The transmission clock multiplying circuit 2 converts the transmission clock signal (b) into the transmission multiplied clock signal (d) of frequency 4fo which is twice the frequency 2fo and applies the transmission multiplied clock signal (d) to the transmission data holding circuit 1, the CMI coding sequential circuit 3 and the modulating circuit 4. The CMI coding sequential circuit 3 converts the transmission data signal (a) into the transmission CMI code (c). The modulating circuit 4 separates the transmission CMI code (c) into the transmission positive pulse signal (d) and the transmission negative pulse signal (e) which are converted into the 3-level CMI signal (g) by the 3-level CMI signal coding circuit 5. In this embodiment, the 3-level CMI signal (g) is transmitted as an optical signal by a light emitting diode of the 3-level CMI signal coding circuit 5 through the signal transmission line 6 comprising the optical fibers. On the reception side, the 3-level CMI signal decoding circuit 7 decodes the 3-level CMI signal of the optical signal into the electrical reception positive pulse signal (A) and reception negative pulse (B) which are demodulated into the reception CMI code (C) by the demodulating circuit 8. The multiplication clock regenerating circuit 11 extracts the reception multiplied clock signal Ⓓ from the 3-level CMI signal ⓖ and applies it to the CMI decoding sequential circuit 9 which converts the reception CMI code ⓒ into the reception data signal Ⓔ and reception clock decoding circuit 12. The reception clock decoding sequential circuit 12 converts the reception CMI code Ⓒ into the reception clock signal Ⓕ by the reception multiplied clock signal. By this, the data signal and the clock signal are extracted separately. On the other hand, the 3-level CMI signal decoding circuit 7 takes out the average value of the 3-level CMI signal which is the optical signal received thereby, and the transmission line monitoring circuit 10 outputs a transmission line monitoring signal for monitoring the abnormality of the signal transmission line by comparing always the averge value with a predetermined value.

Figure 4:
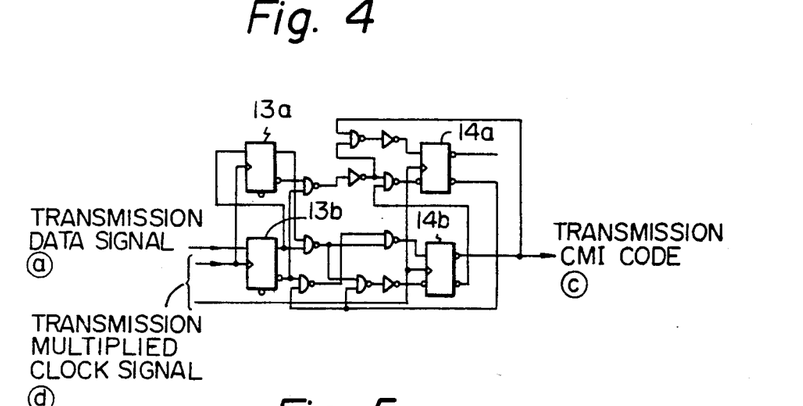
FIG. 4 is a view showing an embodiment of the CMI coding sequential circuit according to the present invention.

FIG. 4 shows an embodiment of the CMI coding sequential circuit 3 according to the present invention, in which reference numerals 13a and 13b denote data holding flip-flops, and reference numerals 14a and 14b denote JK input type flip-flops. The flip-flop 13b holds the transmission data signal ⓐ by the transmission multiplied clock signal ⓓ, and the flip-flop 13a holds the transmission data signals ⓐ sequentially with one clock's delay from the flip-flop 13b by the transmission multiplied clock signal ⓓ. The outputs of the flip-flops 13a, 13b, 14a and 14b are returned to the JK inputs of the flip-flops 14a and 14b by a combinational circuit to form the CMI coding sequential circuit 3. By the sequential circuit 3, 01 of the transmission CMI code ⓒ is outputted to logical 1 of the transmission data signal ⓐ and 00 and 11 of the transmission CMI code ⓒ are alternatively outputted to logical 0 of the transmission data signal ⓐ, to thereby make the transmission CMI signal ⓒ as against the transmission data signal ⓐ as shown in FIG. 2.

Figure 5:
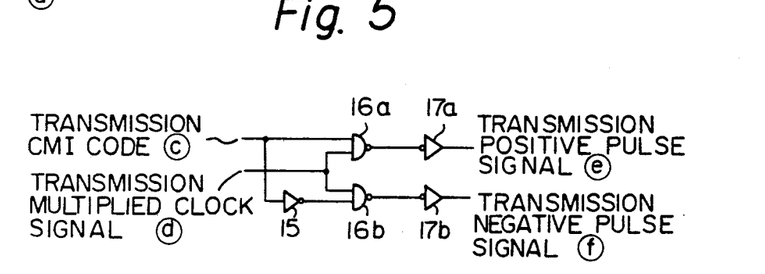
FIG. 5 is a view showing an embodiment of the modulating circuit according to the present invention.

FIG. 5 shows an embodiment of the modualting circuit 4 according to the present invention, in which the transmission CMI code ⓒ is applied to a 2-input NAND gate 16a and inverted by an inverter 17a into the transmission positive pulse signal ⓔ. On the other hand, the transmission CMI code ⓒ inverted by an inverter 15 is applied to a 2-input NAND gate 16b and is further inverted by an inverter 17b into the transmission negative pulse signal ⓕ.

Figure 6:
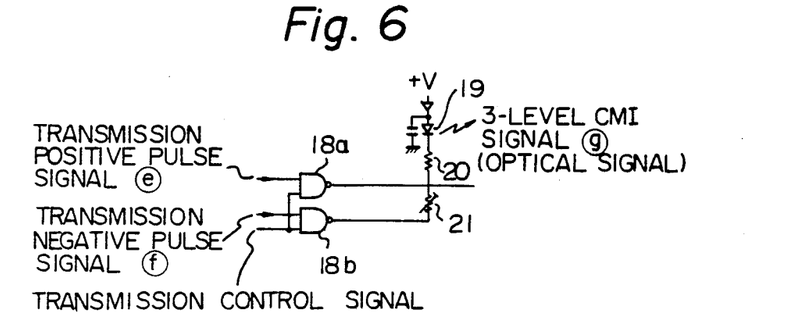
FIG. 6 is a view showing an embodiment of the 3-level CMI signal coding circuit according to the present invention.

FIG. 6 shows an embodiment of the 3-level CMI signal coding circuit 5 according to the present invention, in which the transmission positive pulse signal ⓔ and the transmission negative pulse signal ⓕ are applied to one inputs of 2-input NAND gates 18a and 18b, respectively, and transmission control signals are applied to the other inputs thereof. The transmission control signal to decide whether the optical signal is or is not to be transmitted. If the data signal is to be transmitted, the transmission control signal becomes logical 1, and a light emitting diode 19 emits light at the maximum value when the transmission positive pulse signal ⓔ is applied and at the minimum value when the transmission negative pulse signal ⓕ is applied. In the state where the transmission control signal is logical 1 and yet there is no transmission signal pulse, the light emitting diode 19 emits light at the half value of the maximum value and the minimum value determined by resistors 20 and 21. If the data signal is not to be transmitted, the transmission control signal becomes logical 0 and the light emitting diode 19 is forced off. In FIG. 6, while the transmission data signal ⓐ is transmitted by the diode 19 as an optical pulse signal carried through the signal transmission line 6, it will be obvious to those skilled in the art that another embodiment of the 3-level CMI signal coding circuit 5 for carrying an ordinary electrical pulse signal is easily constructed within the scope of the present invention.

Figure 7:
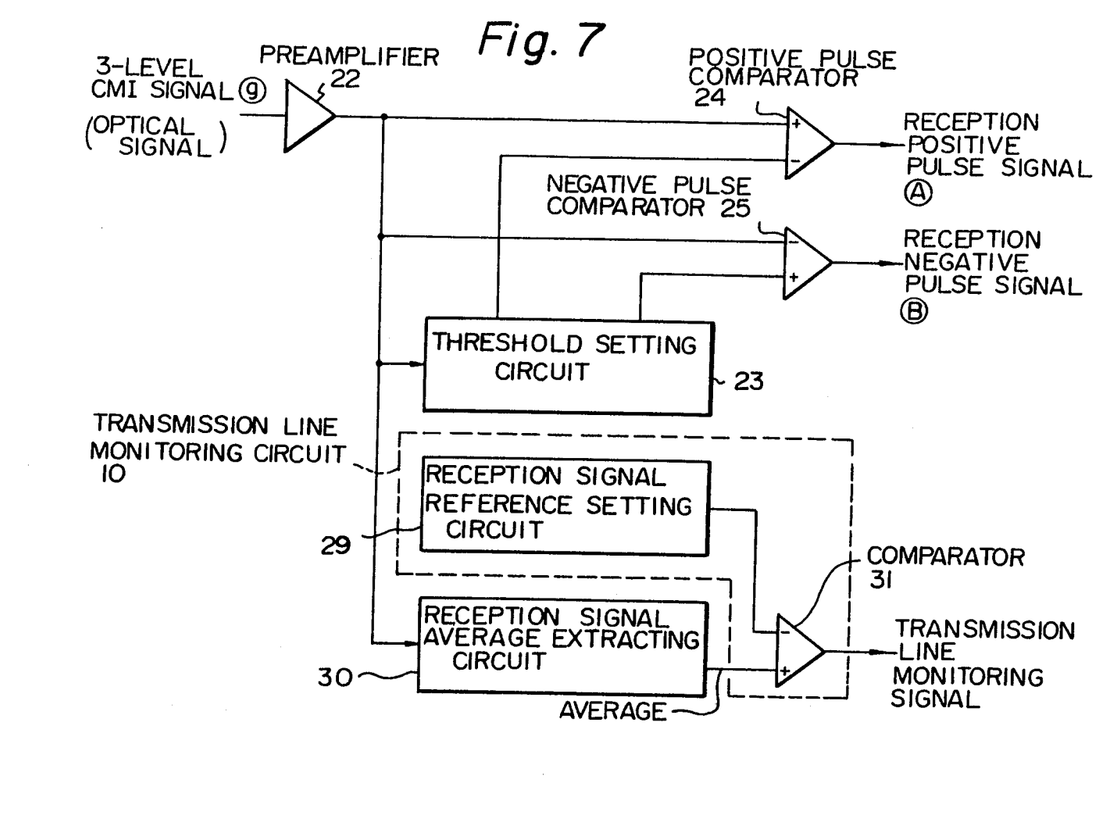
FIG. 7 is a view showing an embodiment of the 3-level CMI decoding circuit according to the present invention.

FIG. 7 shows an emboidment of the 3-level CMI signal decoding circuit 7, in which the 3-level CMI signal ⓖ transmitted through the signal transmission line 6 is amplified by a preamplifier 22 and thereafter applied to a positive pulse comparator 24, a negative pulse comparator 25, and a threshold setting circuit 23 generates the half value of the maximum and the minimum value of the transmitted signal as a predetermined threshold value. The positive pulse comparator 24 outputs the reception positive pulse signal Ⓐ when the 3-level CMI signal ⓖ is larger than the threshold value and, on the other hand, the negative pulse comparator 25 outputs the reception negative pulse signal Ⓑ when the 3-level CMI signal ⓖ is smaller than the threshold value. The transmitted 3-level CMI signal ⓖ is applied also to a reception signal average extracting circuit 30 which extracts the average value of the received 3-level CMI signals ⓖ. The average value is compared by a comparator 31 with a reference value outputted by a reception signal reference setting circuit 29 for distinguishing any abnormality in the signal transmission line, and the comparator 31 outputs a transmission line monitoring signal.

Figure 8:
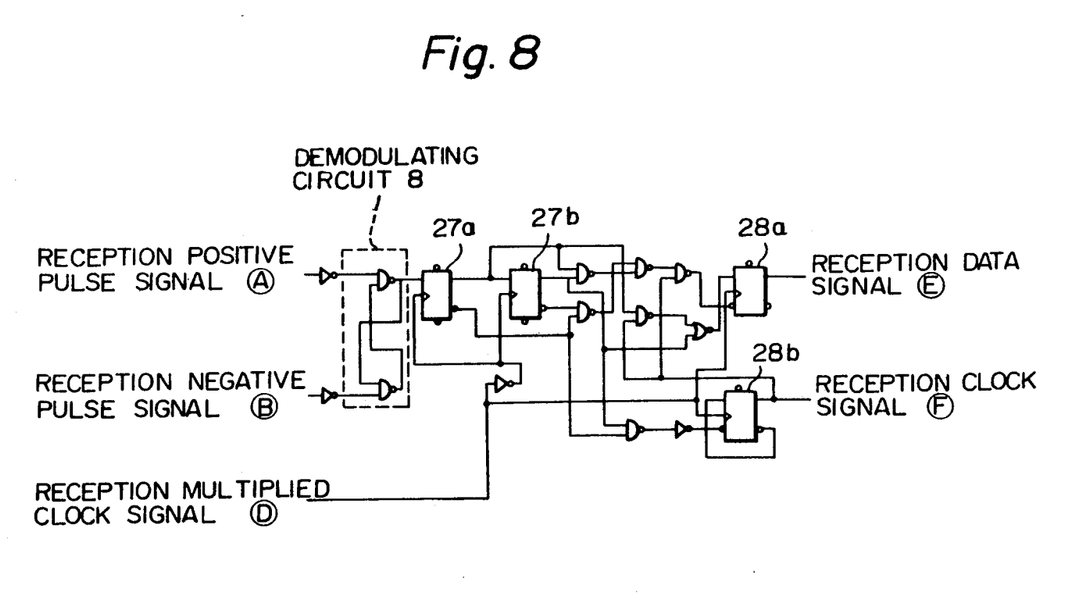
FIG. 8 is a view showing an embodiment of the demodulating circuit and the CMI decoding sequential circuit according to the present invention.

FIG. 8 shows an embodiment each of the demodulating circuit 8 and the CMI decoding sequential circuit 9 according to the present invention. The demodulating circuit 8 is constructed as an RS flip-flop. By data holding flip-flop 27a and 27b, the reception CMI code ⓒ which is the output signal of the RS flip-flop is held sequentially by the reception multiplied clock signal Ⓓ. The data holding flip-flop 27b holds the reception CMI code to the data holding flip-flop 27a one clock later than the reception multiplied clock signal Ⓓ. The CMI decoding sequential circuit 9 formed by returning the outputs of JK input flip-flop 28a and 28b and the outputs of the data holding flip-flops 27a and 27b to the inputs of the JK input flip-flops 28a and 28b by means of a combinational circuit makes, as shown in FIG. 2, the reception data signal Ⓔ and the reception clock signal Ⓕ from the reception positive pulse signal Ⓐ and the reception negative pulse signal Ⓑ.

According to the present invention, as described hereinabove, it is made possible to provide a pulse communication system, which is compact in construction and yet is large both in the signal transmission speed and in the transmission capacity, and further is capable of deciding easily whether absence of a signal pulse is due to any abnormality in the signal transmission line or due to one of the 2-level signal pulses, to thereby monitor the transmission line.

The invention being best described, it will be obvious that the same may be varied in many ways. Such variations are not to be regarded as a departure from the spirit and scope of the invention and all such modifications as would be obvious to one skilled in the art are intended to be included in the scope of the following claims.

What is claimed is:

1. A pulse communication method comprising the steps of:
    converting a data signal to be transmitted into a CMI code in synchronism with a clock signal;

converting said CMI code into a 3-level CMI signal and thereafter transmitting it from the transmission side to the reception side through a transmission line; and decoding the 3-level CMI signal into the CMI code and thereafter regenerating and extracting the data signal and the clock signal separately on the reception side.

2. A pulse communication method according to claim 1, characterized in that the average of the 3-level CMI signals is the half between the maximum and the minimum of the data signals so that the signal transmission line is monitored by comparing said average value with a predetermined reference.

3. A pulse communication method according to claim 1, characterized in that the frequency of the clock signal used in transmission of the data signal is the quadruple of the frequency of the data signal.

4. A pulse communication method according to claim 1, characterized in that the 3-level CMI signal is an optical signal.

5. A pulse communication method according to claim 1, characterized in that corresponded to logical 1 of the data signal is 01 of the CMI code, and corresponded to logical 0 of the data signal are 11 and 00 of the CMI code alternatively, while 10 of the CMI code is not corresponded to any of the data signal.

6. A pulse communication method according to claim 1, characterized in that corresponded to logical 0 of the data signal is 01 of the CMI code, and corresponded to logical 1 of the data signal are 11 and 00 of the CMI code alternatively, while 10 of the CMI code is not corresponded to any of the data signal.

7. A pulse communication method according to claim 1, characterized in that corresponded to logical 1 of the data signal is 10 of the CMI code, and corresponded to logical 0 of the data signal are 11 and 00 of the CMI code alternatively, while 01 of the CMI code is not corresponded to any of the data signal.

8. A pulse communication method according to claim 1, characterized in that corresponded to logical 0 of the data signal is 10 of the CMI code, and corresponded to logical 1 of the data signal are 11 and 00 of the CMI code alternatively, while 01 of the CMI code is not corresponded to any of the data signal.

9. A pulse communication system comprising:
- a transmission clock multiplying circuit for multiplying a transmission clock signal to a required frequency;
- a CMI coding sequential circuit for converting a data signal to be transmitted into a CMI code;
- a 3-level CMI signal coding circuit for converting the CMI code into the 3-level CMI signal;
- a signal transmission line for transmitting the 3-level CMI signal from the transmission side to the reception side;
- a 3-level CMI signal decoding circuit for decoding the received 3-level CMI signal into the CMI code;
- a CMI decoding sequential circuit for decoding the decoded CMI code into the data signal; and
- a clock circuit for extracting the multiplied clock from the received 3-level CMI signal and regenerating the received clock signal.

10. A pulse communication system according to claim 9, further comprising a transmission line monitoring circuit for monitoring the signal transmission line by receiving the average value of the 3-level CMI signals from said 3-level CMI signal decoding circuit and comparing it with a predetermined reference. 11. A pulse communication system according to claim 9, characterized in that said signal transmission line comprises optical fibers.

11. A pulse communication system according to claim 9, characterized in that said signal transmission line comprises optical fibers.

* * * * *